C. S. HOOK.
COMBINED FRICTION AND JAW CLUTCH.
APPLICATION FILED OCT. 7, 1908.
907,051.
Patented Dec. 15, 1908.
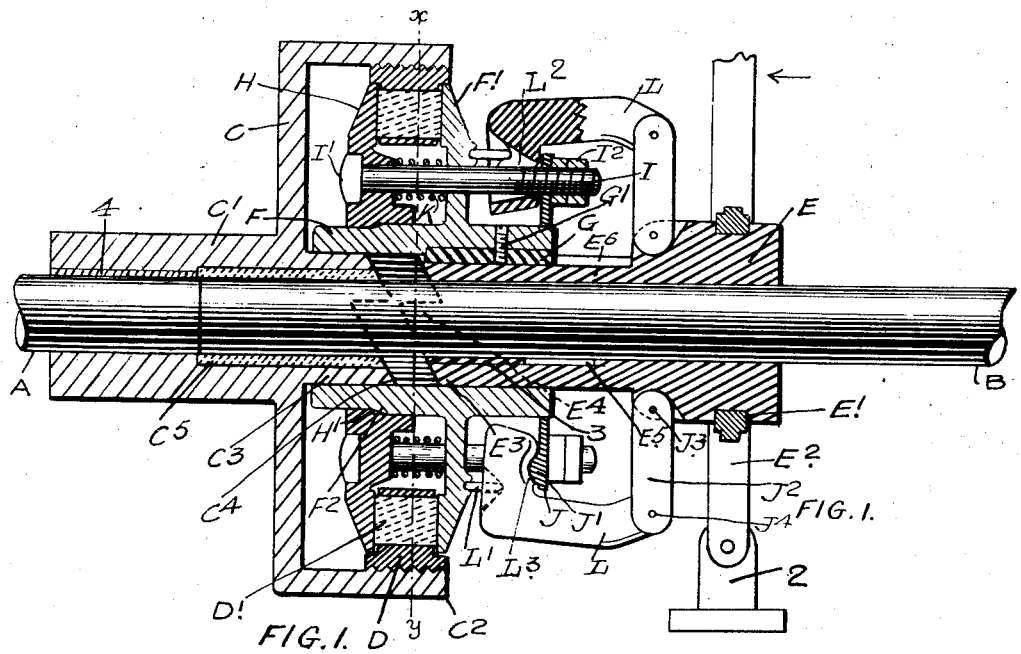
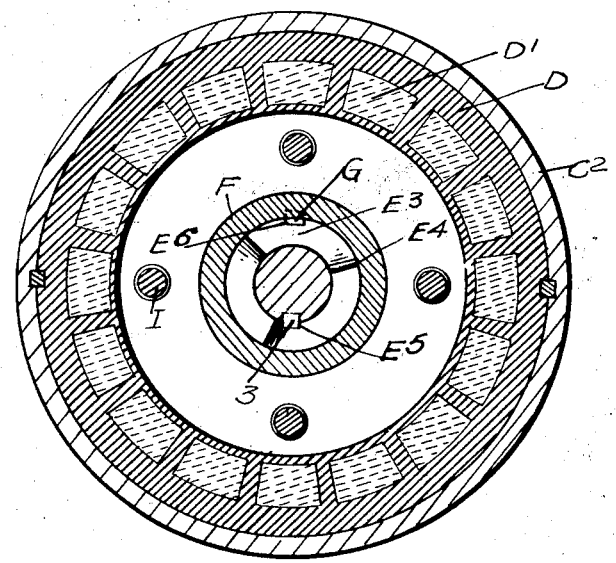
FIG. 2.
WITNESSES.
INVENTOR
C. S. HOOK.

ated Dec. 15, 1908.

UNITED STATES PATENT OFFICE.

CHARLES STEWART HOOK, OF TORONTO, ONTARIO, CANADA, ASSIGNOR OF ONE-HALF TO THOMAS CHRISTOPHER HOOK.

COMBINED FRICTION AND JAW CLUTCH.

No. 907,051.  Specification of Letters Patent.  Patented Dec. 15, 1908.

Application filed October 7, 1908. Serial No. 456,636.

*To all whom it may concern:*

Be it known that I, CHARLES STEWART HOOK, of the city of Toronto, in the county of York, in the Province of Ontario, Canada, have invented certain new and useful Improvements in a Combined Friction and Jaw Clutch, of which the following is a specification.

My invention relates to improvements in combined friction and jaw clutches, and the object of the invention is to devise a simple, positive and effectual clutch of this class in which when the clutch is being applied immediately the friction members are disengaged the jaw members will be engaged and be assured of being held securely together without the necessity of manual exertion and yet free to be disengaged and likewise when the friction members are disengaged in throwing out the clutch and the jaw members thrown out, such jaw members will be positively and effectually held from engagement without manual exertion and yet free to be thrown in again.

My invention consists in that class of a clutch in which a ring or disk is provided with blocks of wood, which protrude on opposite sides thereof and disks or rings, which engage these blocks and jaws on the ends of the sleeves located within the disks, which are designed to engage.

The clutch is adapted for use either as a shaft coupling or as a pulley clutch. In the drawings I have shown my clutch as a shaft coupling. The pulleys, sleeve and jaws and levers and bolts connecting the levers to the disks are all constructed and operate as hereinafter more particularly explained.

Figure 1, is a sectional view showing my improved combined friction and jaw clutch. Fig. 2, is a cross section on the line $x-y$ Fig. 1.

In the drawings like letters of reference indicate corresponding parts in each figure.

A is one shaft and B is the shaft in alinement therewith and to which the shaft A is designed to be coupled.

C is a disk having a hub C' and an internal peripheral annular jaw $C^3$ having preferably a ratchet shaped face $C^4$.

$C^5$ is a sleeve fitting within the hub C' and D is a friction ring, which is externally threaded and fits within a correspondingly internal thread in the flange $C^2$. The ring D has openings at suitable distances apart to contain a series of wooden blocks D', such blocks protruding from the opposite face of the ring as indicated.

E is a sleeve, which fits on the shaft B and is provided with an annular groove E' provided with the usual side pins to which is connected an operating lever $E^2$, which is pivoted on a bracket 2 suitably supported. The construction of the lever $E^2$ and its connection to the sleeve E is of the ordinary type and such as is generally used in many forms of friction clutches. The inner end of the sleeve E is provided with an annular jaw $E^3$, which is designed to co-act with the annular jaw $C^3$, and is provided with ratchet-shaped teeth $E^4$ designed to co-act with the ratchet shaped teeth $C^4$ of the annular jaw $C^3$. The sleeve is provided with an inner keyway $E^5$ next the shaft in which fits a key 3, such key being held in a suitable recess in the shaft B. The keyway $E^5$ is longer than the key, so as to permit of the longitudinal movement of the sleeve E. The periphery of the sleeve E is provided with a keyway $E^6$ as indicated.

F is a sleeve, which fits on the end of the annular jaw $C^3$ and the annular jaw $E^3$ of the sleeve E, both annular jaws being preferably of the same diameter. The sleeve F is provided with a key G, which fits into the keyway $E^6$ being shorter than the keyway. The key is suitably secured in position within the sleeve F by a set screw G'. The sleeve F is provided with an annular flange F', which extends outwardly over the face of the blocks D' with which it is designed to engage.

H is a ring, which fits on the sleeve F being provided with an internal shoulder H', which is designed to be brought against a shoulder $F^2$ of the sleeve F in order to limit the sliding movement of the ring H axially. The ring H is designed to contact also with the opposite faces of the blocks D' to that with which the flange F' is designed to engage or contact.

I are a series of rods or bolts, which pass through the ring H flange F' and second ring J slidable axially on the sleeve F. The rods I have heads I', which engage the ring H and nuts $I^2$ at the opposite end on the outside of the ring J.

K are spiral springs encircling the bolts or rods I and extending between the ring H and the flange F'.

L are levers, which are pivotally connected by links L' to the flange F' and through an orifice L² in which the bolts I extend. The levers are formed with recesses L³ to the outside of the orifices, which fit on the bosses J' forming part of the ring J.

J² are links, which are connected by the pins J³ to the sleeve E, such links at the inner ends fitting in notches in the sleeve E. The outer ends of the links J² are connected by the pins J⁴ to the levers. The bosses J' form a fulcrum for the levers. Normally the pins J³ and J⁴ of the links J² lie in a cross plane at right angles to the axis of rotation.

My invention is shown as applied to a shaft coupling and when applied to a shaft coupling I secure the friction disk C to the shaft A by a key 4, which causes the friction disk to rotate with the shaft A. In case, however, I wish to use my clutch in connection with transmission gear or the like the main shaft would extend through the hub C' and the pulley or other gear and would be secured on the hub. The hub, of course, would be loose on the shaft.

I have shown my clutch with the parts so arranged that the friction disks F and H are in engagement with the blocks D and in short the friction clutch is engaged. The points of the annular ratchet shaped jaws C³ and E' are it will be noticed on reference to the dotted lines of the ratchet jaws close to engagement at this period. By throwing the lever E² in the direction indicated by arrow, so as to throw the sleeve E inwardly, it will be seen that the inner ends of the links J² will be likewise thrown inwardly, thereby pulling down upon the lever L, thus tilting each link on an imaginary fulcrum located between the link L' and the boss J', thereby releasing the pressure on the plate J and at the same time pulling the disk F by the link L' away from the blocks D'. The spring K now acts to force the disks H and F apart. At the precise period that this movement is given to the disk F the points of the jaws have become engaged, the distance of movement of the short end of the lever being just sufficiently long, so that the jaws are engaged before the disks F and H are disengaged with the blocks D'. By forcing the lever E² still farther so as to bring the inner end of the link J² still farther inwardly the jaws are securely locked and the shafts A and B will rotate together. The springs K now forcing the disk F and consequently the lever L outwardly will serve to retain the links J² in their innermost position and lock them there, so that only by the lever E² operating upon the links J² and levers L again can the jaws be unlocked. When they are unlocked the friction disks H and F are necessarily caused to engage again prior to the clutch being entirely thrown out. By throwing the lever E² in the opposite direction to that indicated by arrow the friction disks F and H, which are shown in the drawing as engaging the blocks D' as hereinbefore referred to, are likewise parted, the action of the levers L and links J² being precisely the same as shown in the drawing and before described, and the springs K serving also as hereinbefore described to hold the disks F and H from engagement with the blocks until the lever is moved again in the direction indicated by arrow to throw in the friction clutch and then the jaws.

It will thus be seen that the springs K are essentially important to aid in holding the jaws engaged when the clutch is thrown in and to hold the friction disks disengaged when the clutch is thrown out. When the friction disks are thrown in as the shaft B is keyed to the sleeve E and the sleeve E is keyed to the sleeve F² carrying the friction disks F and as the disk C is secured by the hub C' to the shaft A and the ring D is secured on to the disk C the friction disks H and F engaging with the blocks D' of the ring D the friction disks F and H when thrown in necessarily connect the shafts A and B and when the jaws are thrown in the shafts are directly connected. The shafts A and B are likewise disconnected upon the throwing out of the jaws and the friction disks F and H by the device I have hereinbefore described.

What I claim as my invention is:

1. In a combined friction and jaw clutch, the combination with the friction ring and disk to which the same is secured provided with an annular jaw surrounding the shaft, of sleeve keyed to the shaft capable of longitudinal movement thereon and provided with an inner annular shaped jaw, and means for moving the sleeve longitudinally, and a supplemental sleeve keyed to and capable of longitudinal movement upon the aforesaid sleeve and provided with friction disks, one stationary and the other movable axially, bolts passing through the disks, springs located on the bolts between the disks and means for simultaneously throwing the disks apart and the jaws into engagement as and for the purpose specified.

2. In a combined friction and jaw clutch, the combination with the friction ring and disk to which the same is secured provided with an annular jaw surrounding the shaft, of a sleeve keyed to the shaft capable of longitudinal movement thereon and provided with an inner annular shaped ratchet jaw, and means for moving the sleeve longitudinally, and a supplemental sleeve keyed to and capable of longitudinal movement upon the aforesaid sleeve and provided with friction disks, one stationary and the other movable axially, bolts passing through the disks, springs located on the bolts between the disks and means carried by and operated from the sleeve for throwing the disks apart and the jaws into engagement as and for the purpose specified.

3. In a combined friction and jaw clutch, the combination with the friction ring and disk to which the same is secured provided with an annular jaw surrounding the shaft, of a sleeve keyed to the shaft capable of longitudinal movement thereon and provided with an inner annular shaped ratchet jaw, and means for moving the sleeve longitudinally, and a supplemental sleeve keyed to and capable of longitudinal movement upon the aforesaid sleeve and provided with friction disks, one stationary and the other movable axially, bolts passing through the disks, springs located on the bolts between the disks, links pivoted on the sleeve, links pivotally connected to the disk forming part of the outer sleeve and levers connecting the aforesaid sets of links, such levers being provided with orifices through which the bolts extend as and for the purpose specified.

CHARLES STEWART HOOK.

Witnesses:
R. COBAIN,
L. M. CLEMENT.